(12) United States Patent
Kim et al.

(10) Patent No.: US 9,096,220 B2
(45) Date of Patent: Aug. 4, 2015

(54) METHOD AND SYSTEM FOR CHANGING RUNNING MODE WHEN BATTERY DISCHARGE OF HYBRID VEHICLE IS LIMITED

(71) Applicant: Hyundai Motor Company, Seoul (KR)

(72) Inventors: Sang Joon Kim, Seoul (KR); Joonyoung Park, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 38 days.

(21) Appl. No.: 14/109,331

(22) Filed: Dec. 17, 2013

(65) Prior Publication Data

US 2014/0371961 A1    Dec. 18, 2014

(30) Foreign Application Priority Data

Jun. 18, 2013   (KR) ........................ 10-2013-0069847

(51) Int. Cl.
 *B60W 20/00* (2006.01)
 *B60W 10/08* (2006.01)
 *B60W 10/06* (2006.01)

(52) U.S. Cl.
 CPC ............. *B60W 20/106* (2013.01); *B60W 10/06* (2013.01); *B60W 10/08* (2013.01); *B60W 20/20* (2013.01); *B60W 20/40* (2013.01); *Y10S 903/93* (2013.01)

(58) Field of Classification Search
 CPC ... B60W 20/106; B60W 10/08; B60W 20/40; B60W 10/06; B60W 20/20; Y10S 903/93
 USPC .......................................................... 701/22
 See application file for complete search history.

(56) References Cited

U.S. PATENT DOCUMENTS

| | | | |
|---|---|---|---|
| 4,865,175 A * | 9/1989 | Hirako et al. ................. | 477/186 |
| 8,712,613 B2 * | 4/2014 | Yoshida et al. ................. | 701/22 |
| 2001/0020789 A1 * | 9/2001 | Nakashima ................. | 290/40 C |
| 2006/0005544 A1 * | 1/2006 | Herlihy ........................... | 60/772 |
| 2010/0018790 A1 * | 1/2010 | Allgaier ................... | 180/65.265 |
| 2012/0138413 A1 * | 6/2012 | Moorman et al. ......... | 192/85.62 |

FOREIGN PATENT DOCUMENTS

| | | |
|---|---|---|
| JP | 2004-092564 A | 3/2004 |
| JP | 2006-183547 A | 7/2006 |
| JP | 2008-296907 A | 12/2008 |
| KR | 10-0772314 B1 | 12/2007 |
| KR | 10-1040349 B1 | 6/2011 |
| KR | 10-2013-0044873 A | 5/2013 |
| KR | 10-2013-0046252 A | 5/2013 |

* cited by examiner

*Primary Examiner* — Mary Cheung
*Assistant Examiner* — Frederick Brushaber
(74) *Attorney, Agent, or Firm* — McDermott Will & Emery LLP

(57) ABSTRACT

A method and system for changing a running mode when a battery discharge of a hybrid vehicle is limited include detecting each state of the drive motor and the battery, determining whether a need for a change to a running mode in which an operation of the engine is requested when the drive motor operates and the battery discharge is limited. A starting motor is operated first with an available power of the battery when the change to the running mode is requested. The engine is controlled so that the starting motor may perform a charging operation, for synchronization of an engine clutch, and for driving the drive motor with available power of the battery when the engine has been started by the starting motor.

13 Claims, 8 Drawing Sheets

METHOD AND SYSTEM FOR CHANGING RUNNING MODE WHEN BATTERY DISCHARGE OF HYBRID VEHICLE IS LIMITED

CROSS-REFERENCE TO RELATED APPLICATION

This application claims the benefit of priority to Korean Patent Application No. 10-2013-0069847 filed in the Korean Intellectual Property Office on Jun. 18, 2013, the entire contents of which are incorporated herein by reference.

TECHNICAL FIELD

The present disclosure relates to a method and a system for changing a running mode when a hybrid vehicle battery discharge is limited.

BACKGROUND

As is well known, due to increases in oil prices and exhaust gas regulations, eco-friendly policies and fuel efficiency improvement have been researched in vehicle development. Accordingly, vehicle manufacturers have developed a technology for reducing fuel consumption and decreasing exhaust gas to meet eco-friendly policies and improve fuel efficiency.

Additionally, vehicle manufacturers have focused efforts in developing a technology of a hybrid vehicle which efficiently combines and uses power of an engine and a motor to achieve high fuel efficiency. Hybrid vehicles have met purchase demands of many customers by virtue of high fuel efficiency and eco-friendly characteristics.

FIG. 1 illustrates an exemplary configuration of a typical hybrid vehicle.

Referring to FIG. 1, the hybrid vehicle may include an engine 10, a drive motor 20, an engine clutch 30 for combining or releasing power between the engine 10 and the drive motor 20, a transmission 40, a differential gear device 50, a battery 60, a starting/generating motor 70 for starting the engine 10 or generating power by torque of the engine 10, and a plurality of wheels 80.

Further, the hybrid vehicle may include a hybrid controller (HC) 100 for controlling all operations of the hybrid vehicle and a battery controller (BC) 160 for managing and controlling the battery 60. The battery controller 160 may be referred to as a battery management system (BMS).

The constituent elements of a conventional hybrid vehicle are known to those skilled in the art, and thus, a more detailed description will be omitted.

The starting/generating motor 70 may be called an integrated starter and generator (ISG) or hybrid starter and generator (HSG), in the known art. Hereinafter, in the present specification, the starting/generating motor 70 may be referred to as a starting motor.

The hybrid vehicle may run in a driving mode, such as an electric vehicle (EV) mode using only torque of the drive motor 20, a hybrid electric vehicle (HEV) mode using torque of the drive motor 20 as an auxiliary power source while using torque of the engine 10 as a main power source, and a regenerative braking (RB) mode during braking or when the vehicle runs by inertia. In the RB mode, braking and inertia energies are collected through the electric power generation of the drive motor 20, and the battery 60 is charged with the collected energy.

As described above, the hybrid vehicle uses both mechanical energy of the engine and electrical energy of the battery.

The hybrid vehicle uses an optimum operation region of the engine and the drive motor and collects the energy by the drive motor while braking, thereby improving fuel efficiency and efficiently using the energy.

In the hybrid vehicle, a running method may be generally divided according to a state of charge (SOC) of the battery 60.

FIG. 2 is an exemplary diagram illustrating an SOC of the battery 60 according to a running method of the hybrid vehicle.

Referring to FIG. 2, the charge of the battery 60 of the hybrid vehicle may be divided into a critical overcharge region CH (critical high), an overcharge region H (high), a normal charge region N (normal), a low charge region L (low), and a critical low charge region CL (critical low) according to the SOC. The low charge region may be divided approximately in half to be two regions L1 and L2.

The BC 160 of the hybrid vehicle may perform part load charge control, idle charge control, and power limit control to maintain the SOC of the battery 60 as illustrated in FIG. 2.

Based on the contents illustrated in FIG. 2, the part load charge control is generally performed when the SOC of the battery is in the normal charge region N. The idle charge control is generally performed when the SOC of the battery is in the upper low charge region L1. The power limit control is generally performed when the SOC of the battery is in the lower low charge region L2 and the critical low charge region CL.

While the power limit control is performed, power that is used by an electrical equipment of a high voltage power module system may be limited.

Accordingly, while the power limit control is performed, when an EV running mode needs to be changed into an HEV running mode in a situation in which speed of the drive motor 20 is high, the battery power has to be used first to start the engine. In this case, since power to drive the drive motor may become lacking, drivability and acceleration performance may deteriorate.

In other words, in the prior art, when the battery is in a discharge limit state, such as when the SOC is low, the drive motor is being driven, and a change to the HEV running mode in which the starting motor has to be driven to start the engine is requested, since a portion of available power of the battery should be used to drive the starting motor for starting the engine as illustrated in FIG. 3, problems associated with acceleration performance may occur while the engine clutch is engaged.

The above information disclosed in this section is only for enhancement of understanding of the background of the disclosure, and therefore, it may contain information that does not form the prior art that is already known in this country to a person of ordinary skill in the art.

SUMMARY

The present disclosure provides a method and a system for changing a running mode when a battery discharge of a hybrid vehicle is limited having several advantages. Available power of the battery is used first to drive a starting motor when the battery is in a discharge limited state, a drive motor is being driven, and a change to the HEV running mode, in which a need for driving of an engine is requested. The starting motor is controlled to perform a charging operation, and the engine is controlled so that the engine torque is increased for synchronization of an engine clutch. The drive motor is driven with full battery power after the engine has been started.

An exemplary embodiment of the present disclosure provides a method of changing a running mode when discharge of a battery of a hybrid vehicle that is operated with power of an engine and a drive motor is limited. Each state of the drive motor and the battery are detected, and a change to a running mode is determined, in which an operation of the engine is requested when the drive motor operates, and the battery discharge is limited. A starting motor is first operated with an available power of the battery when the change to the running mode is requested. The engine is controlled so that the starting motor may perform a charging operation, for synchronization of an engine clutch, and for driving, the drive motor with the available power of the battery when the engine has been started by the starting motor.

The change to the running mode in which the operation of the engine is needed may be a change from an electric vehicle (EV) mode to a hybrid electric vehicle (HEV) mode.

The controlling the engine so that the starting motor may perform the charging operation may include setting a first engine torque based on a chargeable torque of the starting motor, and setting a second engine torque that is needed to increase the engine torque.

The first engine torque may be set as a margin value for limiting a speed of the starting motor subtracted from the chargeable torque, and the second engine torque may be set based on a delta RPM of the engine clutch found by subtracting an actual speed from a target speed of the starting motor.

The controlling the starting motor for synchronization of the engine clutch may include setting a target speed of the starting motor for the synchronization of the engine clutch after the engine has been started, and setting a target torque of the starting motor for following the target speed of the starting motor. The target torque of the starting motor may be set as an output value of a feedback controller to follow the target speed.

Another embodiment of the present disclosure provides a system for changing a running mode when a battery discharge of a hybrid vehicle that is operated with power of an engine and a drive motor is limited. An engine clutch controls a power transmission between the engine and the drive motor. A battery supplies electric power that is necessary to operate the drive motor and a starting motor to start the engine. A controller is configured to control the engine, the starting motor, and the drive motor, wherein the controller is operated by a program. The program includes a series of commands for executing the method of changing the running mode when the battery discharge of the hybrid vehicle is limited. Each state of the drive motor and the battery are detected, and a change to a running mode, in which a need for an operation of the engine is requested, is determined when the drive motor operates, and discharge of the battery is limited. A starting motor is first operated with available power of the battery when the change to the running mode is requested. The engine is controlled so that the starting motor may perform a charging operation for synchronization of an engine clutch, and for driving the drive motor with the available power of the battery when the engine has been started by the starting motor.

The controller may be a hybrid controller (HC) that controls overall operation of the engine clutch and the hybrid vehicle.

As described above, according to an embodiment of the present disclosure, it is possible to use the available power of the battery first to drive a starting motor, when a change to the HEV running mode in which the operation of the engine is necessary is requested in a situation that the battery is in the discharge limit state and the drive motor is being driven. Furthermore, according to an embodiment of the present disclosure, it is possible to improve drivability and acceleration performance by controlling the starting motor to perform the charging operation, controlling the engine so that the engine torque is increased for the synchronization of the engine clutch, and driving the drive motor with full power of the battery, after the engine has been started.

DETAILED DESCRIPTION OF THE EMBODIMENTS

Figure 1:
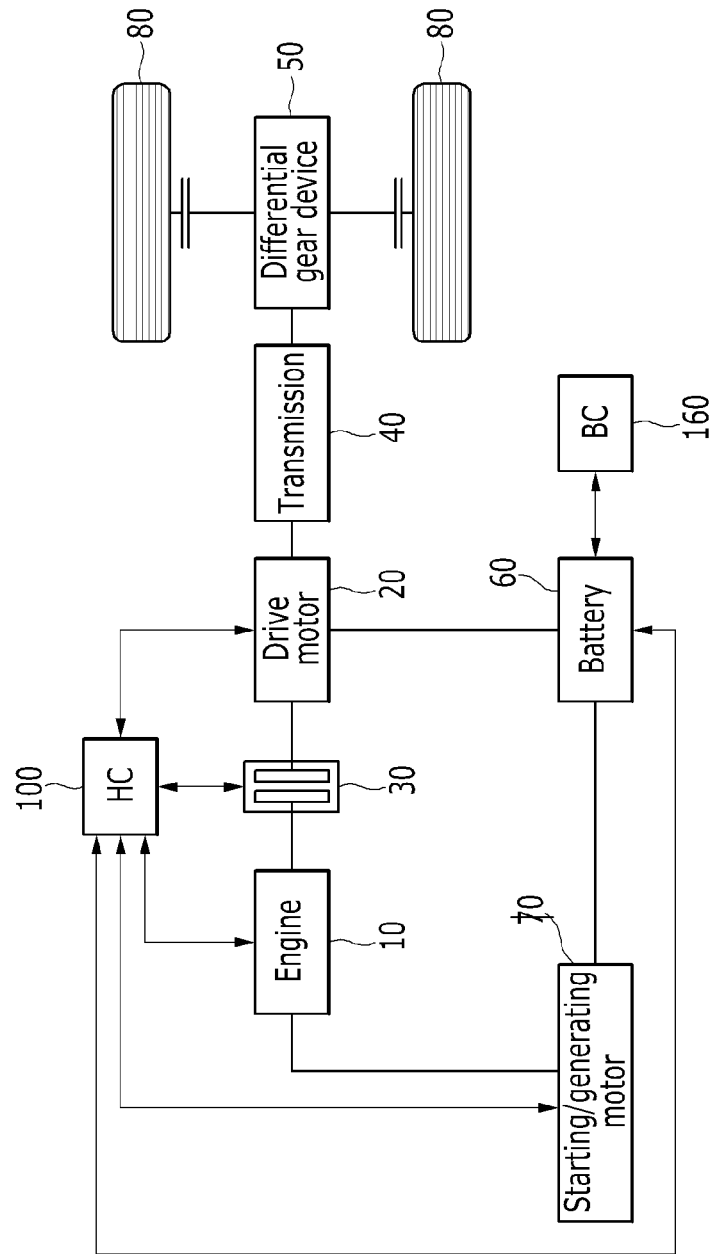
FIG. 1 is an exemplary diagram of a conventional hybrid vehicle according to the related art.
Figure 2:
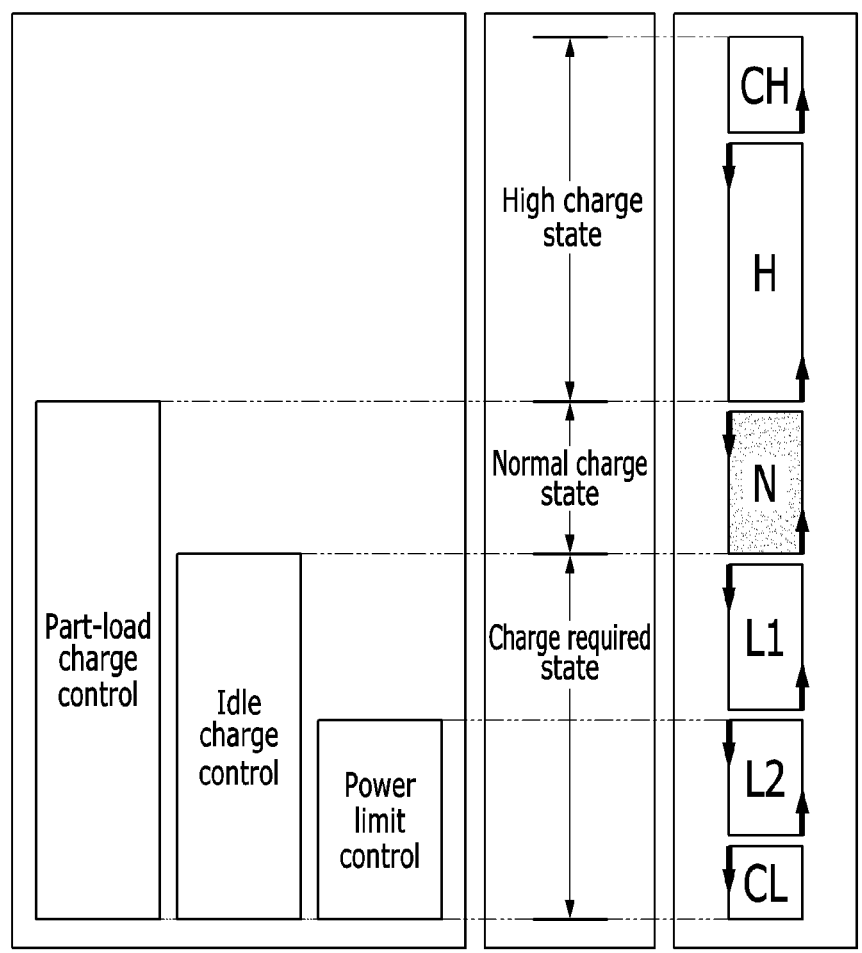
FIG. 2 is an exemplary diagram illustrating a state of charge (SOC) of a battery divided for a running method of a conventional hybrid vehicle, according to the related art.
Figure 3:
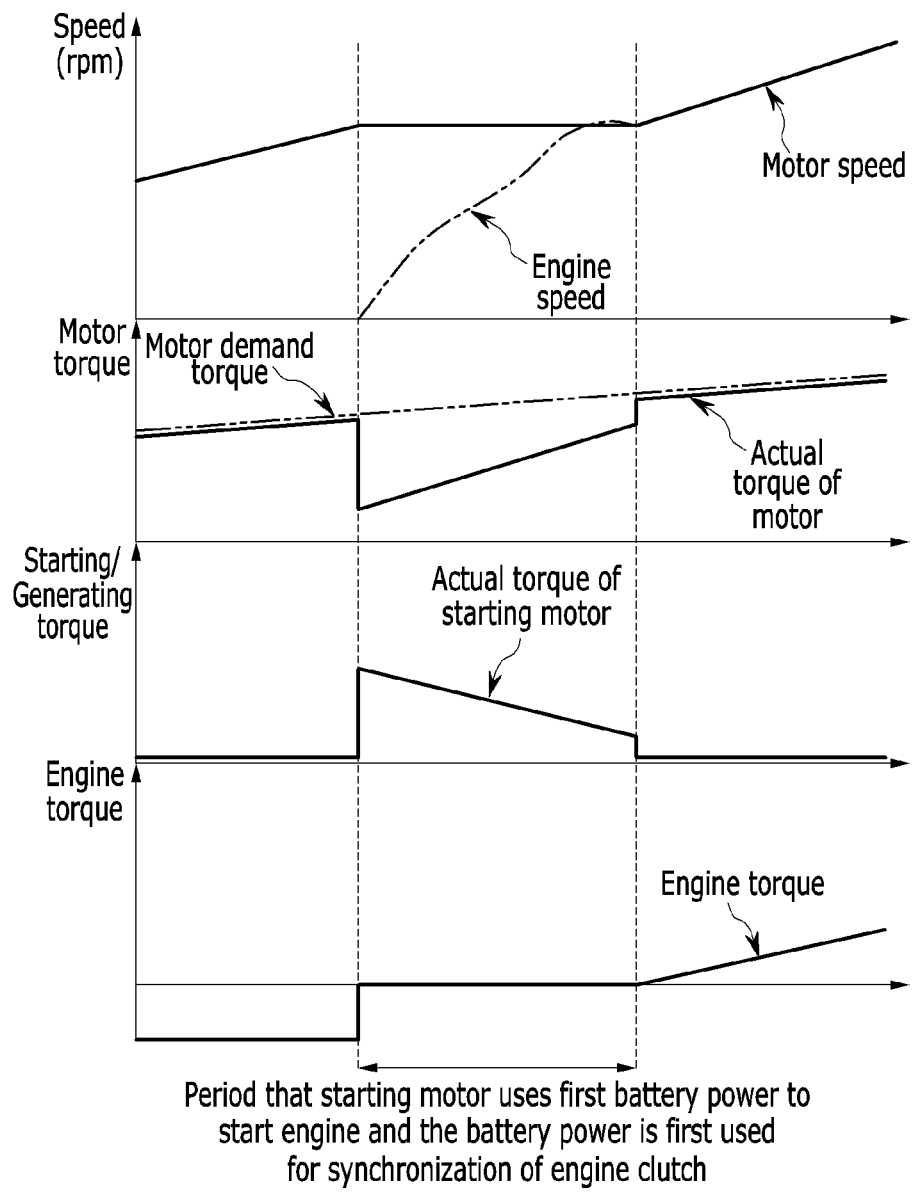
FIG. 3 is an exemplary graph illustrating problems associated with a change of a running mode when a battery discharge of a hybrid vehicle is limited.

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

Further, in the specification, unless explicitly described to the contrary, the word "comprise" and variations such as "comprises" or "comprising" will be understood to imply the inclusion of stated elements but not the exclusion of any other elements. Like reference numerals designate like elements throughout the specification.

Figure 4:
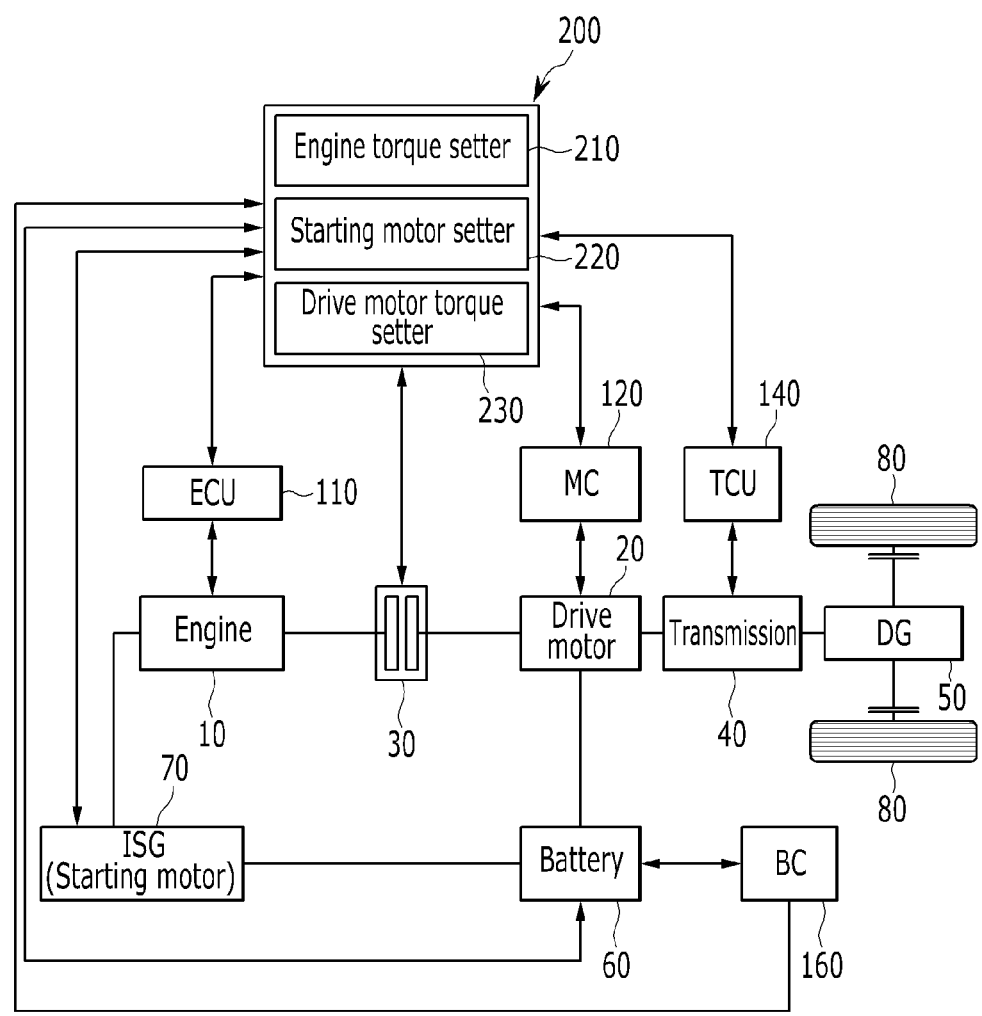
FIG. 4 is an exemplary diagram illustrating a system for changing a running mode when a battery discharge of a hybrid vehicle is limited, according to an exemplary embodiment of the present disclosure.

FIG. 4 is an exemplary diagram illustrating a system for changing a running mode when a battery discharge of a hybrid vehicle is limited, according to an exemplary embodiment of the present disclosure.

The system for changing a running mode according to an exemplary embodiment of the present disclosure is a system that may use an available power of a battery first to drive a starting motor, when a change to the hybrid electric vehicle (HEV) running mode is requested in a situation that the battery is in a discharge limit state and a drive motor is being driven. The system may control the starting motor to perform a charging operation, control the engine so that the engine torque is increased for synchronization of an engine clutch, and drive the drive motor with full power of the battery after the engine has been started.

The system may include an engine clutch 30 configured to control power transmission between an engine 10 and a drive motor 20. A battery 60 supplies electric power to operate the drive motor 20 and a starting motor 70 that starts the engine 10, and a controller 200 is configured to control the engine 10, the starting motor 70, and the drive motor 20. The starting motor 70 may be referred to as an integrated starter and generator (ISG). The controller 200 may use the available power of the battery 60 first to drive the starting motor 70 when a change to the HEV running mode is requested in a situation in which the battery 60 is in a discharge limit state, such as when the state of charge (SOC) is low, and the drive motor 20 is being driven. In addition, the controller 200 may control the starting motor 70 to perform a charging operation, control the engine 10 so that torque of the engine 10 is increased for synchronization of the engine clutch 20, and drive the drive motor 20 with full power of the battery 60, after the engine has been started. Furthermore, the controller 200 may include a hybrid controller or may be included in the hybrid controller. In the specification, the controller 200 may be referred to as a hybrid controller (HC).

A hybrid vehicle to which the system according to an exemplary embodiment of the present disclosure may be applied may include a transmission 40, a differential gear device 50, an engine control unit (ECU) 110 configured to control an operation of the engine 10, a motor controller (MC) 120 configured to control an operation of the motor 20, a transmission control unit (TCU) 140 configured to control an operation of the transmission 40, and a battery controller (BC) 160 configured to control and manage the battery 60.

The HCU (or the controller) 200 may include an engine torque setter 210 configured to set torque and/or torque command of the engine 10, a starting motor torque setter 220 configured to set torque and/or torque command of the starting motor 70, and a drive motor torque setter 230 configured to set torque and/or torque command of the drive motor 20 when a change to the HEV running mode is requested in a situation that the battery 60 is in a discharge limit state and the drive motor 20 is being driven.

The HC 200 may include one or more processors or microprocessors operated by a set program, and the set program comprises a series of commands for executing the method of changing a running mode according to an exemplary embodiment of the present disclosure to be described below.

In an exemplary embodiment of the present disclosure, the HC 200 may control the engine 10, the drive motor 20, and the battery 60 through the ECU 110, the MC 120, and the BC 160.

Figure 8:
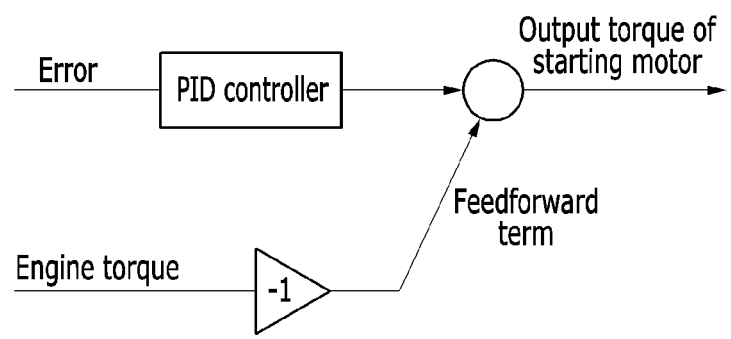
FIG. 8 is an exemplary diagram for explaining operation of a system for changing a running mode according to an exemplary embodiment of the present disclosure.

Referring to FIG. 8, the HC 200 may include a proportional, integral, differential (PID) controller and an integrator to calculate output torque of the starting motor 70.

In the method of changing a running mode according to an exemplary embodiment of the present disclosure to be described below, some processes may be performed by the ECU 110, other processes may be performed by the MC 120, or performed by the BC 160. However, it should be understood that the scope of the present disclosure is not limited to the exemplary embodiment to be described below. The controllers may be implemented with a different combination from that described in the exemplary embodiment of the present disclosure.

Hereinafter, a method of changing a running mode when a battery discharge of a hybrid vehicle is limited according to an exemplary embodiment of the present disclosure will be described in detail with reference to the accompanying drawings.

Figure 5:
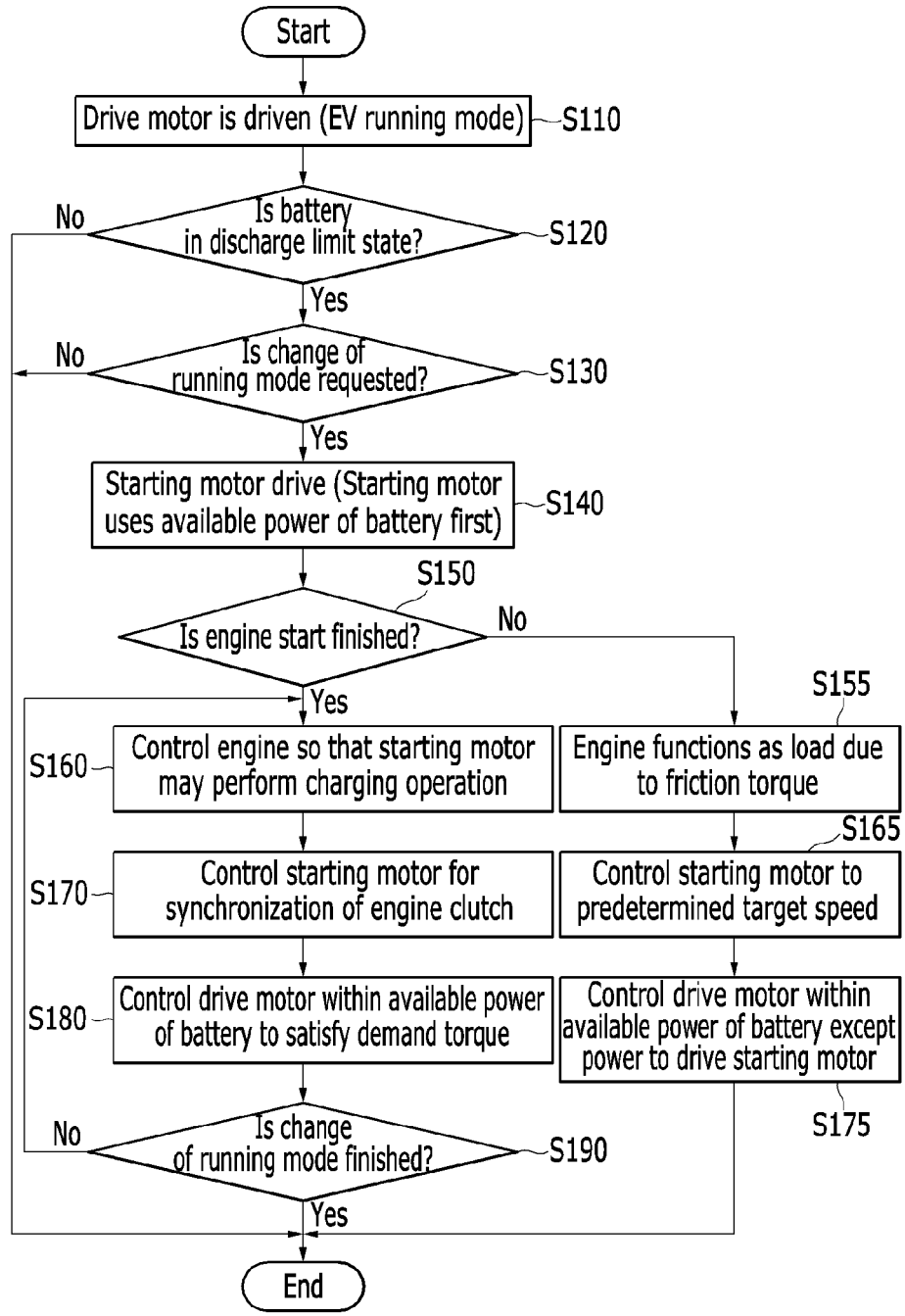
FIG. 5 is an exemplary flowchart illustrating a method of changing a running mode when a battery discharge of a hybrid vehicle is limited, according to an exemplary embodiment of the present disclosure.

FIG. 5 is an exemplary flowchart illustrating a method of changing a running mode when a battery discharge of a hybrid vehicle is limited, according to an exemplary embodiment of the present disclosure.

As shown in FIG. 5, the HC 200 detects a running mode and a state of the battery 60 while the hybrid vehicle is running.

For example, the HC 200 detects whether the hybrid vehicle runs in an EV running mode at step S110, and whether the battery 60 is in a discharge limit state at step S120. The HC 200 may detect the EV running mode by itself or through the MC 120 and/or the ECU 110. The HC 200 may detect the discharge limit state through the BC 160.

In addition, the HC 200 detects whether it is requested to change the EV running mode into an HEV running mode in which an operation of the engine 10 is needed in a situation that the battery 60 is in the discharge limit state, and the drive motor 20 is being driven according to the EV running mode at step S130.

When it is requested that the EV running mode is changed into the HEV running mode at step S130, the HC 200 supplies the available power of the battery 60 to the starting motor 70 to start the engine 10 at step S140.

Figure 7:
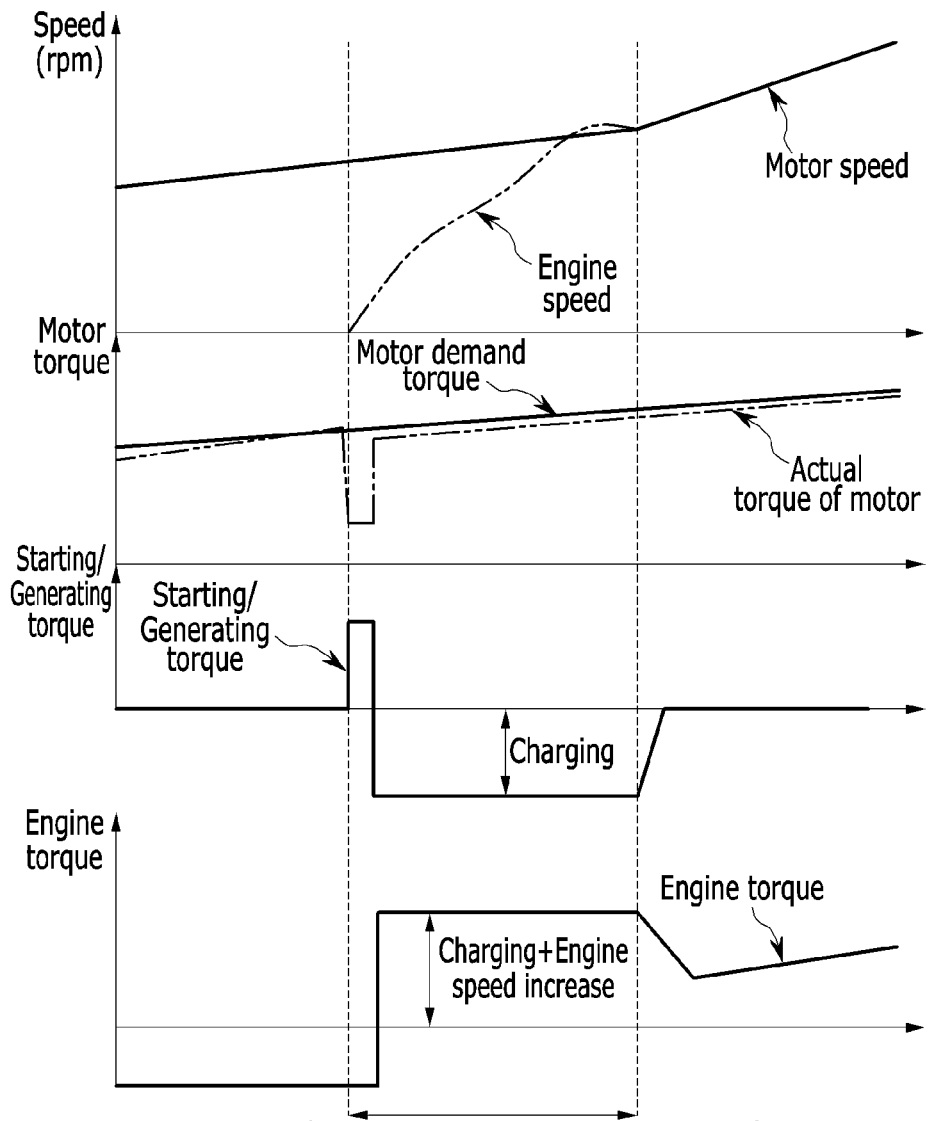
FIG. 7 is an exemplary graph for explaining operation of a method and system for changing a running mode according to an exemplary embodiment of the present disclosure.

As described above, when the available power of the battery 60 is supplied to the starting motor 70, the actual torque of the drive motor 20 instantly drops, and torque of the starting motor 70 increases to a torque value for the engine start as shown in FIG. 7.

Figure 6:
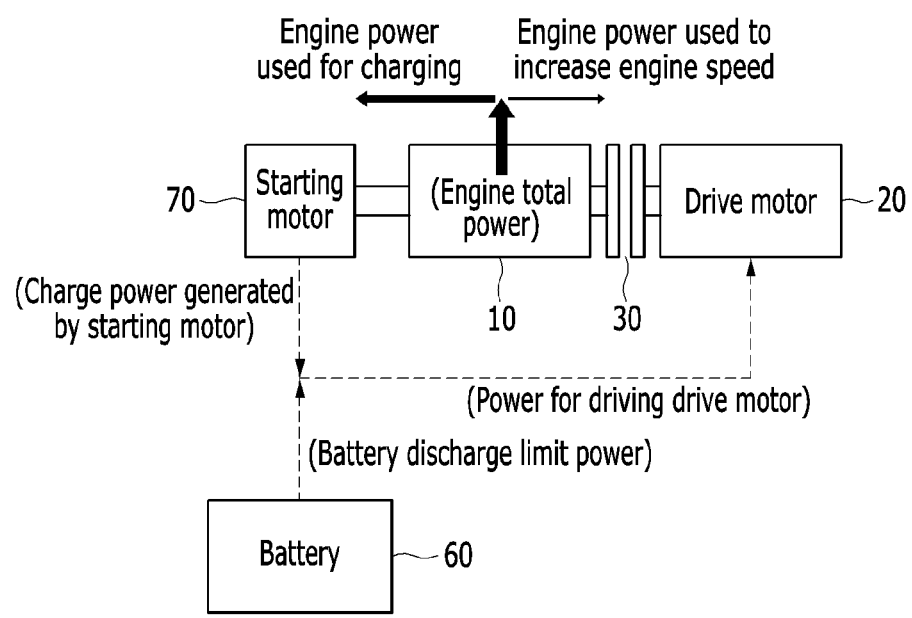
FIG. 6 is an exemplary diagram for explaining operation of a method and system for changing a running mode according to an exemplary embodiment of the present disclosure.

Referring to FIGS. 6 and 7, when the engine start is finished by driving the starting motor 70 at step S150, the HC 200 controls the engine 10 so that the starting motor 70 may perform a charging operation at step S160, the starting motor 70 for synchronization of the engine clutch 30 at step S170, and the drive motor 20 with the available power of the battery 60 to finish the running mode change from the EV running mode to the HEV running mode at step S180 and S190.

The synchronization of the engine clutch 30 is to equalize speed of the engine 10 and the drive motor 20 as shown in FIG. 7.

The HC 200 may set a first engine torque based on chargeable torque of the starting motor 70 and a second engine torque that is needed to increase torque of the engine 10 through the engine torque setter 210, in order to control the engine 10 so that the starting motor 70 may perform the charging operation at step S160.

For example, the HC 200 may set the first engine torque as a value found by subtracting a margin for limiting speed of the starting motor 70 from the chargeable torque and may set the second engine torque based on delta RPM of the engine clutch 30 found by subtracting an actual speed from a target speed of the starting motor 70. The HC 200 may also control the engine 10 and the starting motor 70 so that the starting motor 70 may generate power to charge the battery 60 based on the first and second engine torque as shown in FIG. 7.

Further, in controlling the starting motor 70 for the synchronization of the engine clutch 30 at step S170, the HC 200 may set a target speed of the starting motor 70 for synchronization of the engine clutch 30 and a target torque of the starting motor 70 for following the target speed of the starting motor 70, after the engine 10 has been started.

Referring to FIG. 8, the HC 200 may set the target torque of the starting motor 70 as an output value of a feedback controller to follow the target speed. In this case, the feedback controller may use a feed-forward term.

Referring to FIGS. 6 to 8, the starting motor 70 controls speed and charging operations simultaneously. Here, a load for charging is a torque that the engine 10 generates, and a reverse direction torque of the torque is a torque that the starting motor 70 generates.

In FIG. 8, "−1" in the symbol to which the engine torque is inputted is denoted in a case that a gear ratio of the engine 10 and the starting motor 70 is 1. Accordingly, the number of the gear ratio is the feed-forward term of the starting motor 70.

When the HC 200 controls the drive motor 20 to output a demand torque within the available power of the battery 60 at step S180, the drive motor torque setter 230 of the HC 200 may set a lesser torque in the demand torque and an output enable torque of the drive motor 20 as a torque command of the drive motor 20, wherein the output enable torque of the drive motor 20 may be set as a value found by subtracting power of the starting motor 70 from a discharge limit power of the battery 60.

For example, the HC 200 may set a torque command of the drive motor 20 according to the following equation.

$$TC = \min(DT, OET)$$

(TC: torque command drive motor, DT: demand torque of drive motor, OET: output enable torque of drive motor, that is, "(discharge limit power of battery)−(power of starting motor)")

In the equation, the discharge limit power of battery is a power that is able to be outputted from the current state of the battery 60. As described above, in an exemplary embodiment of the present disclosure, since the starting motor 70 performs the charging operation while controlling the speed, power of the starting motor 70 is a negative value, so the total power that the drive motor 20 may be the value found by subtracting the power of the starting motor 70 from the discharge limit power of the battery 60. Accordingly, although discharge power of the battery decreases due to the discharge limit of the battery, the drive motor 20 may use the power charged by the starting motor 70 as additional power. Since the output enable torque of the drive motor 20 may be calculated based on the current speed and output enable power of the drive motor 20, the HC 200 may set a lessor torque of the output enable torque and the demand torque of the drive motor 20 as a torque for the drive motor 70 for a final output.

Furthermore, when the engine start is not finished at step S150, the HC 200 recognizes the engine 10 as a load with a friction torque at step S155 and controls the starting motor 70 to a predetermined speed to fully start the engine 10 at step S165. The HC 200 further controls the drive motor 20 to output the demand torque within the remaining available power of the battery 60 except power to drive the starting motor 70 to the predetermined speed at step S175.

According to an exemplary embodiment of the present disclosure, it is possible to use the available power of the battery first to drive a starting motor when a change to the HEV running mode is requested in a situation that the battery is in a discharge limit state, and a drive motor is being driven. Furthermore, according to an embodiment of the present disclosure, it is possible to improve drivability and acceleration performance by controlling the starting motor to perform a charging operation, controlling the engine so that torque of the engine is increased for synchronization of an engine clutch, and driving the drive motor with the full battery power after the engine has been started.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A method of changing a running mode when a battery discharge of a hybrid vehicle that is operated with power of an engine and a drive motor is limited, the method comprising:
   detecting each state of the drive motor and the battery;
   determining whether a change to a running mode in which a need for an operation of the engine is requested when the drive motor operates and the battery discharge is limited;
   operating a starting motor first with an available power of the battery when the change to the running mode is requested; and
   controlling the engine so that the starting motor may perform a charging operation for synchronization of an engine clutch, and for driving the drive motor with the available power of the battery when the engine has been started by the starting motor.

2. The method of claim 1, wherein the change to the running mode in which the operation of the engine is requested is a change from an electric vehicle (EV) mode to a hybrid electric vehicle (HEV) mode.

3. The method of claim 2, wherein the controlling the engine so that the starting motor may perform the charging operation comprises:
   setting a first engine torque based on a chargeable torque of the starting motor; and
   setting a second engine torque that is needed to increase the engine torque.

4. The method of claim 3, wherein the first engine torque is set as a margin value for limiting a speed of the starting motor subtracted from the chargeable torque, and the second engine torque is set based on a delta RPM of the engine clutch found by subtracting an actual speed from a target speed of the starting motor.

5. The method of claim 2, wherein the controlling the starting motor for synchronization of the engine clutch comprises:
   setting a target speed of the starting motor for synchronization of the engine clutch after the engine has been started; and
   setting a target torque of the starting motor for following the target speed of the starting motor.

6. The method of claim 5, wherein the target torque of the starting motor is set as an output value of a feedback controller to follow the target speed.

7. A system for changing a running mode when a battery discharge of a hybrid vehicle that is operated with a power of an engine and a drive motor is limited, the system comprising:
   an engine clutch to control a power transmission between the engine and the drive motor;
   a battery to supply electric power that is necessary to operate the drive motor and a starting motor that starts the engine; and
   a controller configured to control the engine, the starting motor, and the drive motor,
   wherein the controller is operated by a program, and the program includes a series of commands for executing a method of changing the running mode when the battery discharge of the hybrid vehicle is limited, comprising:
   detecting each state of the drive motor and the battery;
   determining whether the change to the running mode in which a need for an operation of the engine is requested when the drive motor operates and the battery discharge is limited;
   operating a starting motor first with available power of the battery when the change to the running mode is requested; and
   controlling the engine so that the starting motor may perform a charging operation for synchronization of an engine clutch, and for driving the drive motor with the available power of the battery when the engine has been started by the starting motor.

8. The system of claim 7, wherein the controller is a hybrid controller (HC) that controls an overall operation of the engine clutch and the hybrid vehicle.

9. The system of claim 7, wherein the change to the running mode in which the need for the operation of the engine is a change from an electric vehicle (EV) mode to a hybrid electric vehicle (HEV) mode.

10. The system of claim 9, wherein the controlling the engine so that the starting motor may perform the charging operation comprises:
   setting a first engine torque based on a chargeable torque of the starting motor; and
   setting a second engine torque that is needed to increase a torque of the engine.

11. The system of claim 10, wherein the first engine torque is set as a margin value for limiting a speed of the starting motor subtracted from a chargeable torque, and the second engine torque is set based on a delta RPM of the engine clutch found by an actual speed from a target speed of the starting motor.

12. The system of claim 9, wherein the controlling the starting motor for the synchronization of the engine clutch comprises:
   setting a target speed of the starting motor for the synchronization of the engine clutch after the engine has been started; and
   setting a target torque of the starting motor for following the target speed of the starting motor.

13. The system of claim 12, wherein the target torque of the starting motor is set as an output value of a feedback controller to follow the target speed.

* * * * *